Patented Dec. 9, 1941

2,265,201

UNITED STATES PATENT OFFICE 2,265,201

PROCESS OF PRODUCING HETEROCYCLIC NITROGEN COMPOUNDS CONTAINING A SIX-MEMBERED RING

Willi Schmidt, Ludwigshafen - on - the - Rhine, Bruno Blaser, Berlin, and Friedrich Manchen, Ludwigshafen-on-the-Rhine, Germany, assignors, by mesne assignments, to General Aniline & Film Corporation, New York, N. Y., a corporation of Delaware No Drawing. Application August 23, 1939, Serial No. 291,512. In Germany August 25, 1938

6 Claims. (Cl. 260—293)

The present invention relates to a process of producing heterocyclic nitrogen compounds containing a six-membered ring.

We have found that heterocyclic nitrogen compounds containing a six-membered ring are obtained by treating certain compounds of the furane series, in particular furfurol or its hydrogenation products or conversion products with ammonia, in the presence of hydrogenation catalysts at elevated temperatures with ammonia and hydrogen until piperidine has been formed. The five-membered ring containing oxygen originally present is thus converted into a six-membered ring containing nitrogen, the carbon atom present in the side chain in the initial material taking part in the ring formation.

Among suitable initial materials for the process there may be mentioned compounds of the furane series the 2-position of which is connected with the carbon atom of a substituent, e. g. furfurol itself and also its hydrogenation products, such as tetrahydrofurfurol, furfuryl alcohol or tetrahydrofurfuryl alcohol, and also reaction products of furfurol with ammonia, as for example furfurylamine, difurfurylamine or furfuramide.

The catalysts used may be for example the known metallic hydrogenation catalysts, as for example platinum, nickel, cobalt and copper, or also oxidic or sulphidic hydrogenation catalysts. The catalysts may be used as such, on carriers, as mixed catalysts and in active form. The hydrogenation catalysts used for the preparation of alcohols from acids and their derivatives, such as are described for example in the British specification No. 356,731, or the catalysts used for the preparation of amines directly from acids, ammonia and hydrogen, such as are described for example in the British specification No. 421,718 are especially suitable.

The temperatures to be maintained during the process are largely dependent on the nature of the catalyst and the other working conditions, such as hydrogen pressure, ammonia pressure and arrangement of apparatus. Generally speaking temperatures of more than 150° C. are used. If the temperature be raised so high that the piperidine is dehydrogenated, pyridine may be directly formed. The upper temperature limit for the present process is given by the temperature at which the pyridine is still stable under the working conditions. Generally speaking temperatures exceeding 500° C. are not necessary.

The process may be carried out at atmospheric pressure, advantageously at increased pressure, in the gas or liquid phase. By increasing the pressure, the yields per unit of time and space are mainly increased. Generally speaking, therefore, pressures of more than 50 atmospheres are used, the ammonia partial pressure amounting to more than 5 atmospheres. The upper pressure limit is determined by the stability to pressure of the apparatus used. There is no special advantage in using pressures of more than 500 atmospheres.

When working in the liquid phase it is advantageous to use inert diluents, such as methanol or cyclohexane. When working in the gas phase or in the liquid phase, indifferent gases or vapors, as for example nitrogen, carbon dioxide, carbon monoxide or methane, may be present in the gas phase.

When working in the liquid phase, the process may be rendered continuous for example by allowing the liquid initial mixture to trickle over a rigidly arranged catalyst or by leading a suspension of the catalyst in the initial mixture over rigidly arranged filler bodies.

The following examples will further illustrate how this invention may be carried out in practice but the invention is not restricted to these examples.

Example 1

A mixture of 100 grams of furfurol with 200 cubic centimeters of a cold saturated solution of ammonia in methanol and 10 grams of a cobalt catalyst is heated in a high pressure vessel under a hydrogen pressure of 200 atmospheres at 150° C. until no further decrease in pressure can be observed. After this time, 40 grams of liquid ammonia are pressed in and the mixture heated to 250° C., the total pressure being kept at 200 atmospheres by subsequently pressing in hydrogen. After heating for 14 hours, the mixture is freed from catalyst and distilled. Piperidine is obtained in a state of excellent purity.

Example 2

40 grams of liquid ammonia are introduced into a high pressure vessel containing a suspension of 10 grams of a cobalt catalyst in 100 grams of 2-monofurfurylamine, hydrogen then being pressed in until a total pressure of 50 atmospheres is obtained. The whole is heated for 10 hours at 250° C., the total pressure being kept at 200 atmospheres by pressing in hydrogen. By distillation of the reaction mixture a good yield of piperidine is obtained.

Example 3

40 grams of anhydrous ammonia are introduced into a high pressure vessel containing 10 grams of a copper chromite catalyst with a barium chromite content of 1 per cent, and 100 grams of 2-monofurfuryl amine. The whole is heated to 280° C., hydrogen then being pressed in until a total pressure of 230 atmospheres is obtained. The heating is continued for 10 hours, while the pressure is maintained by replenishing the hydrogen used up. By distillation of the reaction mixture a good yield of piperidine is obtained.

Similar yields are obtained when using a catalyst containing copper chromite and tungsten sulphide.

*Example 4*

Carbon monoxide is pressed into a high pressure vessel containing 100 grams of tetrahydro-2-furfurylamine and 10 grams of a cobalt catalyst until a pressure of 20 atmospheres is obtained. 40 grams of anhydrous ammonia are added and hydrogen is introduced until a total pressure of 100 atmospheres is obtained. The whole is then heated to 250° C. for 10 hours, the total pressure of 200 atmospheres being maintained by subsequently pressing in hydrogen. By distillation of the reaction mixture a good yield of piperidine is obtained.

*Example 5*

100 cubic centimeters per hour of liquid 2-furfurylamine are vaporized and led in a cycle together with a mixture of 3 parts by volume of hydrogen and 1 part by volume of ammonia under a pressure of 200 atmospheres through a high pressure vessel having a volume of 1 liter and being charged with a cobalt catalyst applied to silica gel. The vessel is heated to 250° C. The reaction mixture leaving the vessel is cooled, and from the condensate obtained piperidine is distilled off in good yields. The unchanged furfurylamine is returned into the cycle.

*Example 6*

Hydrogen is pressed into a high pressure vessel containing 100 grams of tetrahydro-2-furfurylamine, 40 grams of anhydrous ammonia and 10 grams of a nickel catalyst until a pressure of 30 atmospheres is obtained. The whole is then heated to 450° C. for 5 hours. By distillation of the reaction mixture a mixture of pyridine and piperidine is obtained in a good yield.

*Example 7*

Over 1.6 liters of a nickel catalyst applied to pumice stone activated by 2 per cent of chromium oxide, 2 per cent of zinc oxide, and 2 per cent of barium oxide there is led at from 160° to 170° C. per hour 20 grams of gaseous furfurol, 20 liters of ammonia and 20 liters of hydrogen. The reaction gases are cooled with ice, the condensate separates into two layers which are freed from ammonia, the aqueous layer then being salted out with potassium carbonate. The oil obtained is distilled and there is obtained a fraction constituting piperidine.

What we claim is:

1. A process for the production of heterocyclic nitrogen compounds containing a six-membered ring which consists in treating with hydrogen at temperatures between 200° C. and that at which piperidine is decomposed compounds of the furane series selected from the group consisting of furfurol, reaction products of furfurol with ammonia and hydrogenation products thereof in the presence of ammonia and a hydrogenation catalyst until piperidine is formed and recovering the latter from the reaction products.

2. A process for the production of heterocyclic nitrogen compounds containing a six-membered ring which consists in treating with hydrogen in the liquid phase under superatmospheric pressure at temperatures between 200° C. and that at which pyridine is decomposed compounds of the furane series the 2-position of which is connected with the carbon atom of a substituent in the presence of ammonia and a hydrogenation catalyst until piperidine is formed and recovering the latter from the reaction products.

3. A process for the production of heterocyclic nitrogen compounds containing a six-membered ring which consists in treating with hydrogen in the liquid phase under superatmospheric pressure at temperatures between 200° C. and that at which pyridine is decomposed 2-furfurylamine in the presence of ammonia and a hydrogenation catalyst until piperidine is formed and recovering the latter from the reaction products.

4. A process for the production of heterocyclic nitrogen compounds containing a six-membered ring which consists in treating with hydrogen in the liquid phase under superatmospheric pressure at temperatures between 200° C. and that at which pyridine is decomposed furfurol in the presence of ammonia and a hydrogenation catalyst until piperidine is formed and recovering the latter from the reaction products.

5. A process for the production of heterocyclic nitrogen compounds containing a six-membered ring which consists in treating with hydrogen in the liquid phase under superatmospheric pressure at temperatures between 200° C. and that at which pyridine is decomposed tetrahydro-2-furfurylamine in the presence of ammonia and a hydrogenation catalyst until piperidine is formed and recovering the latter from the reaction products.

6. A process for the production of piperidine which consists in treating with hydrogen under a pressure between 150 and 400 atmospheres and at temperatures between 200 and 350° C. compounds of the furane series the 2-position of which is connected with the carbon atom of a substituent in the presence of ammonia and a hydrogenation catalyst and recovering the piperidine from the reaction products.

WILLI SCHMIDT.
BRUNO BLASER.
FRIEDRICH MANCHEN.